Jan. 26, 1965   E. T. OAKES ETAL   3,167,034
DISPENSING APPARATUS
Filed Oct. 3, 1961
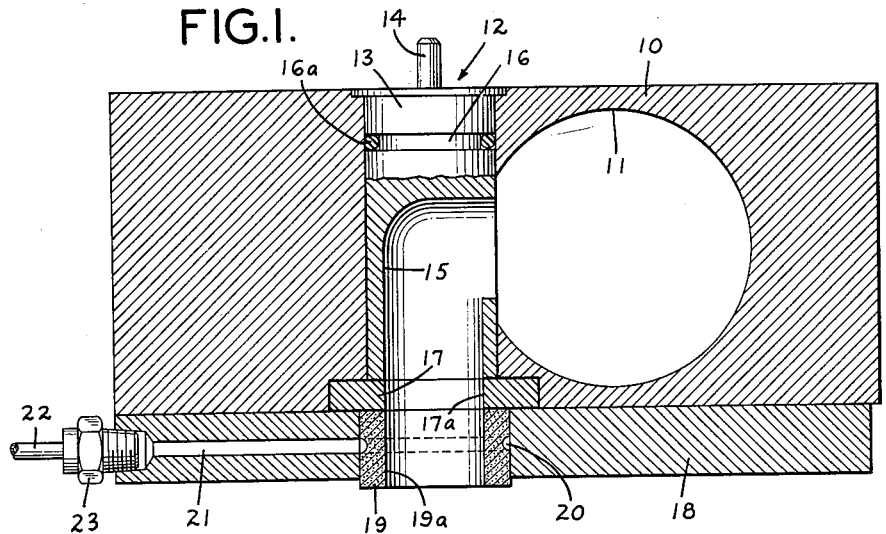
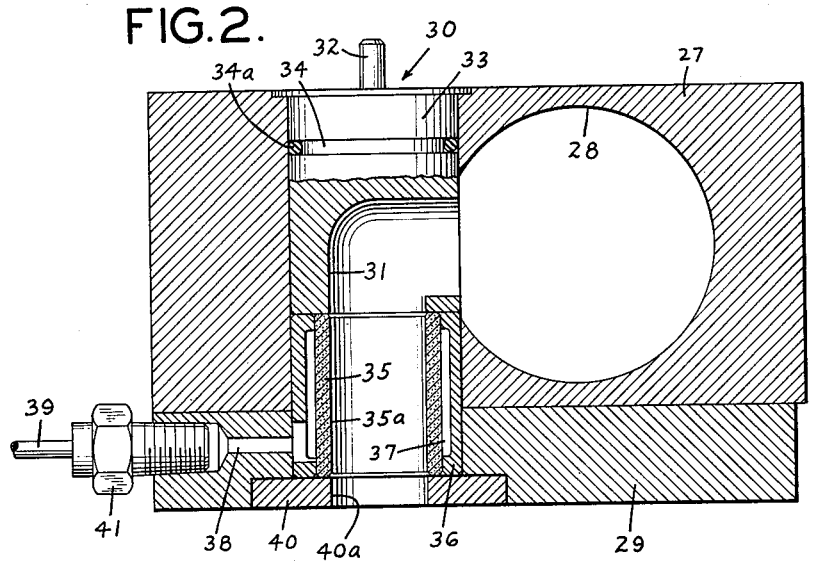
INVENTORS:
EARLE THOMAS OAKES
LEWIS GARTH DOOM
PAUL E. SUNDHEIM
PAUL ALBERT McELLIGOTT
BY
THEIR ATTORNEYS

United States Patent Office 3,167,034
Patented Jan. 26, 1965

3,167,034
DISPENSING APPARATUS
Earle Thomas Oakes, Islip, Lewis Garth Doom, East Islip, Paul E. Sundheim, Bayport, and Paul Albert McElligott, Greenlawn, N.Y., assignors to The E. T. Oakes Corporation, Islip, N.Y., a corporation of New York
Filed Oct. 3, 1961, Ser. No. 142,575
3 Claims. (Cl. 107—27)

This invention relates to dispensing devices and more particularly to apparatus for depositing controlled amounts of a semi-fluid substance under pressure on a receiving surface.

In the preparation of bakery, confectionery, and other like items on a mass production basis, it is necessary to provide carefully controlled flow of the batter or other raw material to the baking pans or other receiving surfaces. In general, the preparation equipment is so arranged that the basic ingredients are continually mixed and then supplied under pressure to a metering or dispensing device. The baking sheets or trays are moved beneath the dispensing apparatus and the latter is operated to release controlled amounts of the batter or like material onto the moving surface at precisely controlled times. To produce uniformity of weight, size, and appearance in the finished product, the dispensing apparatus must be capable of accurate control.

One of the problems encountered in presently known dispensing devices used in the baking industry results from the tendency of the semi-fluid batter or like substance to adhere to the dispensing structure as it is discharged. This causes uneven deposition of the material on the baking surfaces and eventually may clog the dispensing structure itself. By means of the present invention, this tendency to stick to the dispensing structure is virtually eliminated and increased uniformity of deposition is achieved.

Accordingly, the primary object of the present invention is to provide improved dispensing apparatus for depositing semi-fluid substances onto a receiving surface.

Another object of the present invention is to provide dispensing apparatus for use in the baking and confectionary industries, or the like, for depositing semi-fluid substances on a receiving surface wherein the tendency of the substance to stick to the apparatus is minimized or eliminated entirely.

A further object of this invention is to provide improved dispensing apparatus for semi-fluid substances wherein the tendency of the substance to stick to the structure is minimized by the provision of a layer of fluid, such as air, interposed between the material and the interior walls of the dispensing apparatus.

Yet another object of this invention is to provide dispensing apparatus for depositing a semi-fluid substance on a receiving surface, said apparatus having an improved valve structure for controlling the amount of substance deposited in combination with means to reduce the adherence of the material to the dispensing apparatus.

In accordance with the present invention, a dispensing structure is provided including channel defining means for conducting semi-fluid material from a source to a position over the receiving surface. The channel includes a section composed of a material which is porous, to permit the diffusion of air or other gas therethrough. As the semi-fluid material passes through the channel, air under pressure is supplied to the exterior of the porous portion, through which it diffuses, to provide a cushion or layer of air between the interior wall of the channel and the material as it passes therethrough. The material is thus actually out of contact with the dispensing structure just prior to its deposition on the receiving surface and the tendency to stick to the apparatus is thereby eliminated. To control the precise amount of material to be supplied to the receiving surface, a slider valve is provided consisting of a slidable plate disposed transversely to the channel and having an opening therein which forms part of the channel when the valve is in its open position. By reciprocating the slider plate, the valve is alternately opened and closed, thereby controlling the amounts of material passing therethrough.

The foregoing and other objects, features, and advantages of the present invention will become more apparent from the following detailed description thereof when taken in conjunction with the accompanying drawing, in which:

FIGURE 1 is a cross-sectional view through a typical dispensing arrangement illustrating the details of one embodiment of the present invention; and FIGURE 2 is a cross-section through dispensing apparatus illustrating the details of a second embodiment of the present invention.

Referring now to FIGURE 1, the numeral 10 indicates a conventional supply head or manifold, such as used in the baking industry, for conducting batter or the like, from a mixing apparatus to the dispensing means. The head 10 may be elongated to permit it to carry several separately operated dispensing mechanisms. As is well known, the head will be mounted in a suitable position over the movable platform which carries the baking tins or other receiving surfaces.

The head 10 has a supply opening 11 therein which is connected at one end to a source of material, such as batter or the like, which is to be deposited on the receiving surface. The material may be supplied to the head 10, for example, by a continuous mixer of the type described in the Oakes Patent No. 2,572,049. The head 10 is also provided with one or more vertical bores, each receiving a dispensing mechanism 12.

The structure 12 includes a generally cylindrical portion 13 which may be inserted and withdrawn from the bore by means of pin 14 fixed to its upper end. A peripheral groove 16 and an associated O ring 16a may also be provided to effect a liquid-tight seal between the member 13 and the head 10. The element 13 is also provided with a bore 15 extending longitudinally over part of its length and which opens through its side wall to communicate directly with the opening 11 in the head 10 when in its operative position. Rotation of element 13 by means of pin 14 is effective to vary the size of the communicating passage between the supply opening 11 and the bore 15 to thereby regulate the flow of material through the apparatus.

A slot is provided in the underside of head 10 to accommodate a slider valve plate 17. The slot, and slider valve, are shown in cross-section in FIGURE 1 and are so related that the valve 17 may slide within the slot in a direction represented by motion in and out of the plane of the drawing. The slider valve 17 is provided with an aperture 17a therein of a size substantially the same as that of the bore 15 in the member 13. With valve 17 in its open position, the aperture 17a effectively forms a continuation of the bore 15. When closed, the valve plate 17 effectively seals the channel. Any suitable apparatus (not shown) may be utilized to effect the reciprocal motion of the slider valve 17 required to open and close the channel.

Fastened to the lower surface of the head 10 is a nozzle plate 18 provided with an aperture therein adapted to receive a hollow cylindrical nozzle element 19, which is formed of a hard, but porous, substance. The element 19, which may, for example, be composed of a sintered material that will permit the diffusion of a fluid therethrough, is provided with a bore 19a of the same size as and in register with the bore 15 and opening 17a. The bore 19a effectively forms an extension of the dispensing channel and, as will be apparent from the drawing, with the valve 17 in its open position an uninterrupted path for the flow of material is provided from the opening 11.

The exterior surface of the nozzle portion 19 is provided with a peripheral groove 20 extending completely around the member and which communicates with a passage 21 provided in the nozzle plate 18. A source of fluid, such as air, 22 is coupled via coupling element 23 to the other end of the passage 21.

During operation of the dispensing apparatus, air, or other suitable gas, is supplied through the conduit 22 and via channel 21 to the peripheral groove 20. Since the material of the nozzle member 19 is porous, the air diffuses therethrough and out over its entire inner surface into the channel. During each cycle of operation, the batter is forced under pressure through the head 10 into the bore 15 forming the beginning of the channel, the valve 17 is reciprocated to its open position allowing the material to pass through the aperture 17a and into the bore 19a of the nozzle element 19. The air layer created by the diffusion thereof through the member 19 however, provides a blanket or layer around the interior surface of the bore 19a which prevents the adherence of the batter material thereto and the batter discharges freely from the nozzle and onto the receiving surface. The slider valve 17 then returns to its closed position, thereby determining the amount of batter to be deposited on the receiving surface. Since there is no adherence to the dispensing apparatus, the quantity of batter may be precisely predetermined, insuring uniformity of product. Furthermore, no sticky residue remains in the mechanism to interfere with its operation. As the receiving surface moves under the dispensing apparatus, the valve 17 repeatedly opens and closes, allowing additional predetermined amounts of batter material to flow freely through the nozzle element and to be deposited on the receiving surface. In the embodiment of FIG. 1, air is preferably continuously supplied to the porous element 19, although intermittent applications of air, suitably timed with respect to the cutoff stroke of valve 17, may also be employed, such as in the embodiment of FIG. 2 to be described hereinafter.

Another embodiment utilizing the principles of the present invention is illustrated in FIGURE 2. The head 27 having a material admitting opening 28 therein is provided with a bore to receive a cylindrical element 30. As in the embodiment shown in FIGURE 1, the element 30 includes an adjusting pin 32 and a cooperating groove and O ring, 34, 34a, for sealing the element in the head. There is also provided in the element 30, a bore 31 communicating between the lower end of the element 30 and, through its side wall, to the opening 28 in the head 27. Beneath the element 30 is disposed a member 35 of porous material of the same type as element 19 of FIGURE 1, having an interior opening 35a of the same size and in register with the bore 31. Surrounding the member 35, is a cylindrical element 36 provided with rim portions at its upper and lower ends to leave an annular space 37 encircling the exterior wall of the porous element 35. The lower end of the annular member 36 is received within a suitable bore provided in the nozzle plate 29. A valve element 40, similar in construction and operation to vale 17 of FIGURE 1, is slidably mounted in a suitably provided slot in the lower surface of nozzle plate 29. The slider valve 40 has an aperture 40a therein of the same size as and in registry with the bore 31 and opening 35a, whereby a dispensing channel is provided between the batter source and the receiving surface. A source of air or other fluid under pressure is coupled by a conduit 39, and fitting 41 to passage 38, which communicates with an opening provided in the cylindrical member 36.

In the embodiment of FIGURE 2, as the batter passes from the head into the channel formed by bore 31 and opening 35a, air is forced under pressure into the annular space 37 and thence through the porous walls 35 into the interior opening 35a. The air layer thus created separates the batter from contact with the walls of the opening 35a and, when the aperture 40a of the slider valve 40 is brought into registry with the channel, the batter from the source passes therethrough without adhering to the interior walls. As in the case of the apparatus of FIGURE 1, the reciprocation of the valve member 40 meters the material supplied to the receiving surface and may be reciprocated by any well known means. As in the case of the embodiment of FIG. 1, air may be supplied to element 35 continuously or intermittently, although it is preferable in the apparatus of FIGURE 2 to apply it intermittently to avoid mixing air with the material in the valve structure.

In practice, it has been found most advantageous to provide a plurality of dispensing valves in a single manifold, each of the valves communicating with the supply passage therein. In such an arrangement, it is desirable to control the valves such that say, half are open and depositing material on the receiving surface while the remainder are closed, to thereby prevent undesirable pressure build-up from occurring in the system.

Although the invention has been described in connection with materials and apparatus utilized in the baking and confectionery industries, it will be apparent that it may be used with other materials and in other fields. Moreover, although air has been described as the preferred fluid, it will be obvious that in some applications other substances, either gaseous or liquid, may be suitable. It is also evident, of course, that the openings in the slider valves 17, 40, and the porous elements 19, 35 may have varied shapes, such as rectangular or triangular, as well as round, to provide products of any desired configuration. These and many other modifications will occur to those skilled in the art and it is intended that the scope of this invention be limited only by the appended claims.

What is claimed is:

1. Dispensing apparatus for depositing a semi-liquid material on a receiving surface comprising, means defining a dispensing channel having an input end and an output end, said channel including a portion formed of porous substance, a source of said material under pressure connected to the input end of said channel, means to continuously supply gas under pressure through the porous substance of said portion of said channel to displace said material from the interior walls of said channel while the material is therein and passing therethrough, whereby the reduced adherence of said material to said channel enables more uniform and controllable deposition thereof, and means in said channel for controlling the amount of material to be deposited on said receiving surface.

2. Apparatus according to claim 1 wherein said porous portion of said channel is at the output end thereof and said valve means is interposed between said source of material and said portion of said channel.

3. Apparatus according to claim 1 wherein said porous portion of said channel is disposed between said source of material and said valve means.

References Cited in the file of this patent

UNITED STATES PATENTS

| | | |
|---|---|---|
| 1,971,852 | Goebels | Aug. 28, 1934 |
| 2,879,809 | Vogt | Mar. 31, 1959 |